United States Patent
Cho et al.

(10) Patent No.: US 12,456,176 B2
(45) Date of Patent: Oct. 28, 2025

(54) IMAGE SIGNAL PROCESSOR AND NOISE REMOVAL METHOD

(71) Applicant: SK hynix Inc., Icheon-si (KR)

(72) Inventors: Chang Hun Cho, Icheon-si (KR); Ja Min Koo, Icheon-si (KR); Seung Hyun Kim, Icheon-si (KR); Tae Hyun Kim, Icheon-si (KR); Jae Hwan Jeon, Icheon-si (KR); Woo Young Jeong, Icheon-si (KR); Chang Hee Pyeoun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 47 days.

(21) Appl. No.: 18/526,569

(22) Filed: Dec. 1, 2023

(65) Prior Publication Data

US 2024/0420289 A1    Dec. 19, 2024

(30) Foreign Application Priority Data

Jun. 16, 2023   (KR) .......................... 10-2023-0077555

(51) Int. Cl.
   *G06T 5/70* (2024.01)
   *G06T 7/20* (2017.01)
   *G06T 7/50* (2017.01)

(52) U.S. Cl.
   CPC .................. *G06T 5/70* (2024.01); *G06T 7/20* (2013.01); *G06T 7/50* (2017.01)

(58) Field of Classification Search
   CPC .. G06T 5/70; G06T 7/20; G06T 7/215; G06T 7/50
   See application file for complete search history.

(56) References Cited

U.S. PATENT DOCUMENTS

| 7,129,973 | B2 * | 10/2006 | Raynor | H04N 1/32128 |
| | | | | 348/231.3 |
| 8,700,641 | B2 * | 4/2014 | Covell | G06F 16/683 |
| | | | | 707/758 |
| 8,996,810 | B2 * | 3/2015 | Liang | G06F 16/2365 |
| | | | | 711/119 |
| 11,215,700 | B2 * | 1/2022 | Schockaert | G01S 17/36 |

(Continued)

FOREIGN PATENT DOCUMENTS

KR      1020220010192 A     1/2022

*Primary Examiner* — Michael B. Pierorazio
(74) *Attorney, Agent, or Firm* — WILLIAM PARK AND ASSOCIATES LTD.

(57) ABSTRACT

An image signal processor may include a data receiver configured to receive image data including depth values corresponding to pixels included in an image obtained from a distance measurement sensor. The image signal processor may also include a motion detector configured to detect motion in the image using either a first motion detection method which uses pixels or a second motion detection method which uses preset kernels, based on amplitude of the light source and generate a detection result indicating whether the motion is included in the target image. A noise remover removes noise from the target image using either a first noise removal method which uses previous image data corresponding to previous images or a second noise removal method which uses the image data corresponding to the target image based on the detection result.

19 Claims, 6 Drawing Sheets

(56) References Cited

U.S. PATENT DOCUMENTS

| | | | |
|---|---|---|---|
| 11,706,544 B2* | 7/2023 | Sawada | H04N 25/77 348/308 |
| 2007/0124756 A1* | 5/2007 | Covell | G06F 16/635 348/E7.071 |
| 2016/0156972 A1* | 6/2016 | Oztaskent | G06Q 30/0246 725/14 |
| 2017/0094349 A1* | 3/2017 | Maughan | H04N 21/44226 |
| 2019/0373195 A1* | 12/2019 | Minagawa | H04N 25/78 |
| 2019/0383946 A1* | 12/2019 | Namba | G06V 20/58 |
| 2021/0211312 A1* | 7/2021 | Lu | H04L 9/3278 |

* cited by examiner

PREVIOUS FRAME · CURRENT FRAME

PREVIOUS FRAME · CURRENT FRAME

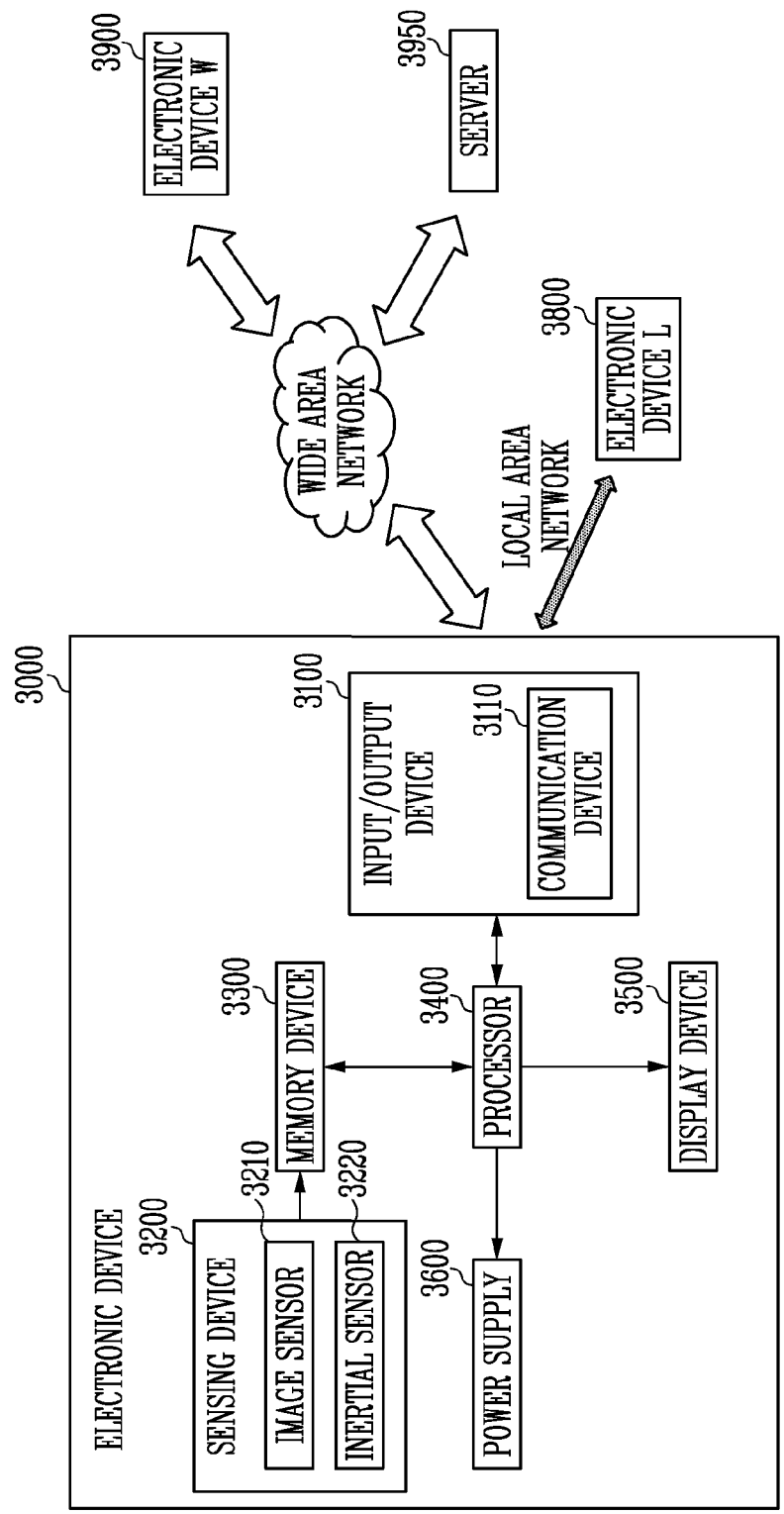

IMAGE SIGNAL PROCESSOR AND NOISE REMOVAL METHOD

CROSS-REFERENCE TO RELATED APPLICATION

The present application claims priority under 35 U.S.C. § 119 (a) to Korean patent application number 10-2023-0077555 filed on Jun. 16, 2023, in the Korean Intellectual Property Office, the entire disclosure of which is incorporated by reference herein.

BACKGROUND

1. Technical Field

Various embodiments of the present disclosure relate to an image signal processor, and more particularly to an image signal processor and a noise removal method.

2. Related Art

Image sensors may be classified as either a charge coupled device (CCD) image sensor or a complementary metal oxide semiconductor (CMOS) image sensor. The CMOS image sensor, has recently attracted attention because of its low manufacturing cost, low power consumption, and its ability to be integrated with, i.e., formed on the same semiconductor substrate with a peripheral circuit.

An image sensor included in a smartphone, a tablet PC, or a digital camera may acquire image information of an external object by converting light reflected from the external object and impinges on the sensor into electrical signals. An image signal processor may process image data received from the image sensor.

An image signal processor may detect motion of an object in an image by comparing successive (consecutive) images or by utilizing a boundary between images. The image signal processor may also remove noise contained in an image using a noise-containing image or remove noise using an image generated before the noise-containing image.

SUMMARY

Various embodiments of the present disclosure are directed to an image signal processor and a noise removal method, which can: 1) determine whether motion is included in an image depending on the characteristics of a light source used for image sensing; 2) perform a noise removal operation using image data corresponding to a single frame when motion is included in the image based on the determined detection method, and 3) perform a noise removal operation using image data corresponding to multiple frames when no motion is included in the image.

An embodiment of the present disclosure may provide for an image signal processor that includes a data receiver configured to receive image data including depth values respectively corresponding to pixels included in an image from a distance measurement sensor comprising a light source, a motion detector configured to detect motion in a target image represented by the received image data using one of a first motion detection method, which uses pixels and a second motion detection method which uses preset kernels, based on an amplitude of the light source, the motion detector being additionally configured to generate a detection result indicating whether the motion is included in the target, and a noise remover configured to remove noise from the target image using one of a first noise removal method which uses previous image data corresponding to previous images generated before the target image is generated and a second noise removal method which uses only the image data corresponding to the target image, determined based on the detection.

An embodiment of the present disclosure may provide a noise removal method for an image signal processor. The noise removal method may include receiving image data including depth values respectively corresponding to pixels included in an image obtained from a distance measurement sensor, the distance measurement sensor using a light source for modulating amplitude, determining motion in a target image using at least one of a first detection method which uses pixels based on an amplitude of the light source and a second detection method which uses preset kernels, generating a detection result indicating whether motion is included in the target image depending on the target motion detection method, selecting, based on the detection result, a target noise removal method, that is one of: a first noise removal method which uses previous image data corresponding to previous images that are generated before the target image and a second noise removal method which uses only the image data corresponding to the target image, and performing a noise removal operation depending on the target noise removal method.

An embodiment of the present disclosure may provide for an image system that includes a distance measurement sensor comprising a light source and which is configured to generate image data including depth information using the light source, and an image signal processor configured to remove noise contained in a current frame image based on the image data received from the distance measurement sensor. The image signal processor may include a motion detector configured to detect motion in the current frame image using one of a first detection method which uses pixels based on strength of a signal generated by the light source and a second detection method which uses preset kernels, and to generate a detection result indicating whether motion is included in the current frame image depending on the target motion detection method, and a noise remover configured to remove noise in the current frame image using one of a first noise removal method which uses previous image data corresponding to previous frames that precedes a current frame and a second noise removal method which uses only the image data corresponding to the current frame and to perform a noise removal operation depending on the target noise removal method.

BRIEF DESCRIPTION OF THE DRAWINGS

FIG. 8 is a block diagram illustrating an electronic device including an image signal processor according to an embodiment of the present disclosure.

DETAILED DESCRIPTION

Specific structural or functional descriptions in the embodiments according to the concept of the present disclosure introduced in this specification or application are only for description of the embodiments according to the concept of the present disclosure. The embodiments according to the concept of the present disclosure may be practiced in various forms, and should not be construed as being limited to the embodiments described in the specification or application.

Hereinafter, various embodiments of the present disclosure will be described in detail with reference to the accompanying drawings in which embodiments of the present disclosure are shown so that those skilled in the art to which the present disclosure pertains can easily practice the technical spirit of the present disclosure.

Figure 1:
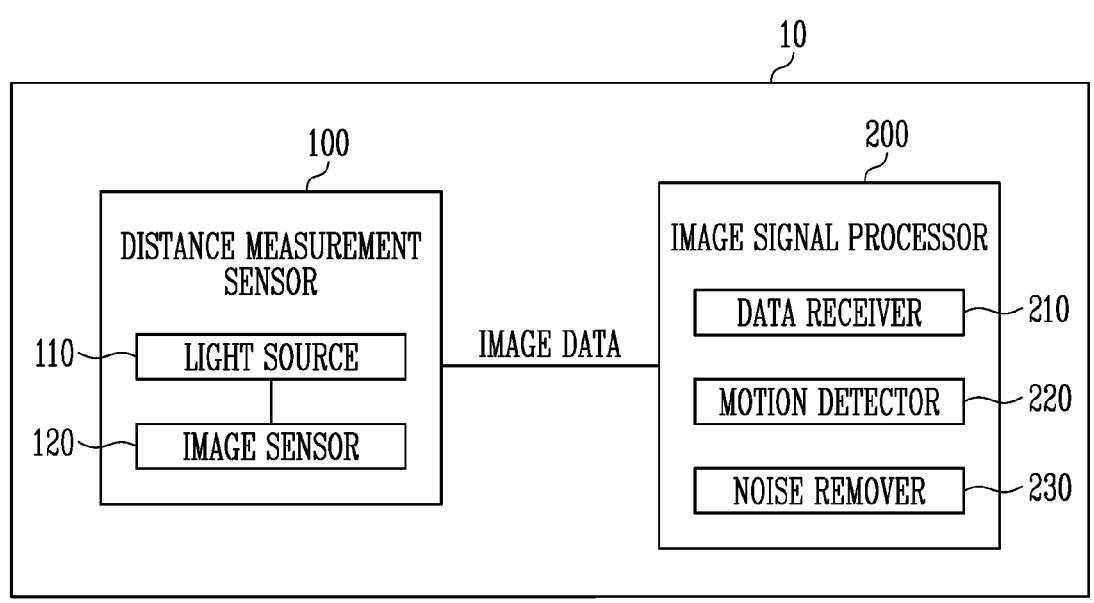
FIG. 1 is a diagram illustrating an image system according to an embodiment of the present disclosure.

FIG. 1 is a diagram illustrating an image system according to an embodiment of the present disclosure.

Referring to FIG. 1, an image system 10 may include a distance measurement sensor 100 and an image signal processor 200. The distance measurement sensor 100 may include a light source 110 and an image sensor 120. The image signal processor 200 may include a data receiver 210, a motion detector 220, and a noise remover 230.

The distance measurement sensor 100 may sense an object and may generate image data including depth values at least one of which indicates or "corresponds to" the distance between the measurement sensor 100 and the sensed object. The light source 110 portion of the distance measurement sensor 100 may emit light outside the distance measurement sensor 100, and the image sensor 120 may receive reflected light.

The image sensor 120 may include a pixel array, a controller, and a signal converter. The pixel array may include picture elements, well known in the art and commonly known as pixels, each of which generates an analog signal based on light that impinges on the pixel. The signal converter may convert the analog signals output from each pixel into corresponding digital signals, which may be referred to as converted digital signals.

The converted digital signals may be referred to as image data. The controller may control the overall operation of the image sensor 120 so that the image data is generated and transferred to the image signal processor 200.

In an embodiment of the present disclosure, the distance measurement sensor 100 may be a time-of-flight (ToF) sensor. The distance measurement sensor 100 may control the strength of a signal generated by the light source 110. The distance measurement sensor 100 may control the intensity or amplitude of the light source 110. The amplitude of light generated by the light source 110 may be modulated.

The distance measurement sensor 100 may generate image data including depth values respectively corresponding to the pixels included in the image sensor 120, and may transfer the generated image data to the image signal processor 200. The distance measurement sensor 100 may sense a plurality of images depending on the frame rate of the image sensor 120. When the image frame rate is 60 fps, 60 images corresponding to images captured in 60, temporally-consecutive frames may be sensed for one second. The distance measurement sensor 100 may transfer image data of a single frame to the image signal processor 200, sixty (60) times in one second.

The image signal processor 200 may perform an image processing operation based on image data. More particularly, the data receiver 210 may receive the image data from the distance measurement sensor 100. The data receiver 210 may include a memory device which stores the received data.

The motion detector 220 may detect whether motion is included in each image based on the image data and to that end, the motion detector 220 may select one of at least two different motion detection methods, based on the amplitude or intensity of the reflected light received by the image sensor 120. The motion detector may detect motion included in the image using a first detection method which uses pixels, or it may detect motion using a second detection method which uses preset kernels. Regardless of the detection method that is used, as shown in step S740, the motion detector 220 may generate a detection result indicating whether motion is detected or "included" in the image represented by image data.

As used herein, "noise" and "image noise" refer to artifacts in an image, which do not originate from the original scene content. Generally speaking, noise is a statistical variation of a measurement created by a random process. In imaging, noise appears as a grainy structure covering the image.

The noise remover 230 may perform a noise removal operation by removing noise contained in the image. The noise remover 230 may determine a noise removal method based on the detection result. The noise remover 230 may remove noise contained in the image based on a first noise removal method, which uses image data corresponding to previous images generated before a noise removal target image is captured. The noise remover 230 may also remove noise from an image based on a second noise removal method, which uses only image data corresponding to (from) the noise removal target image.

Figure 2:
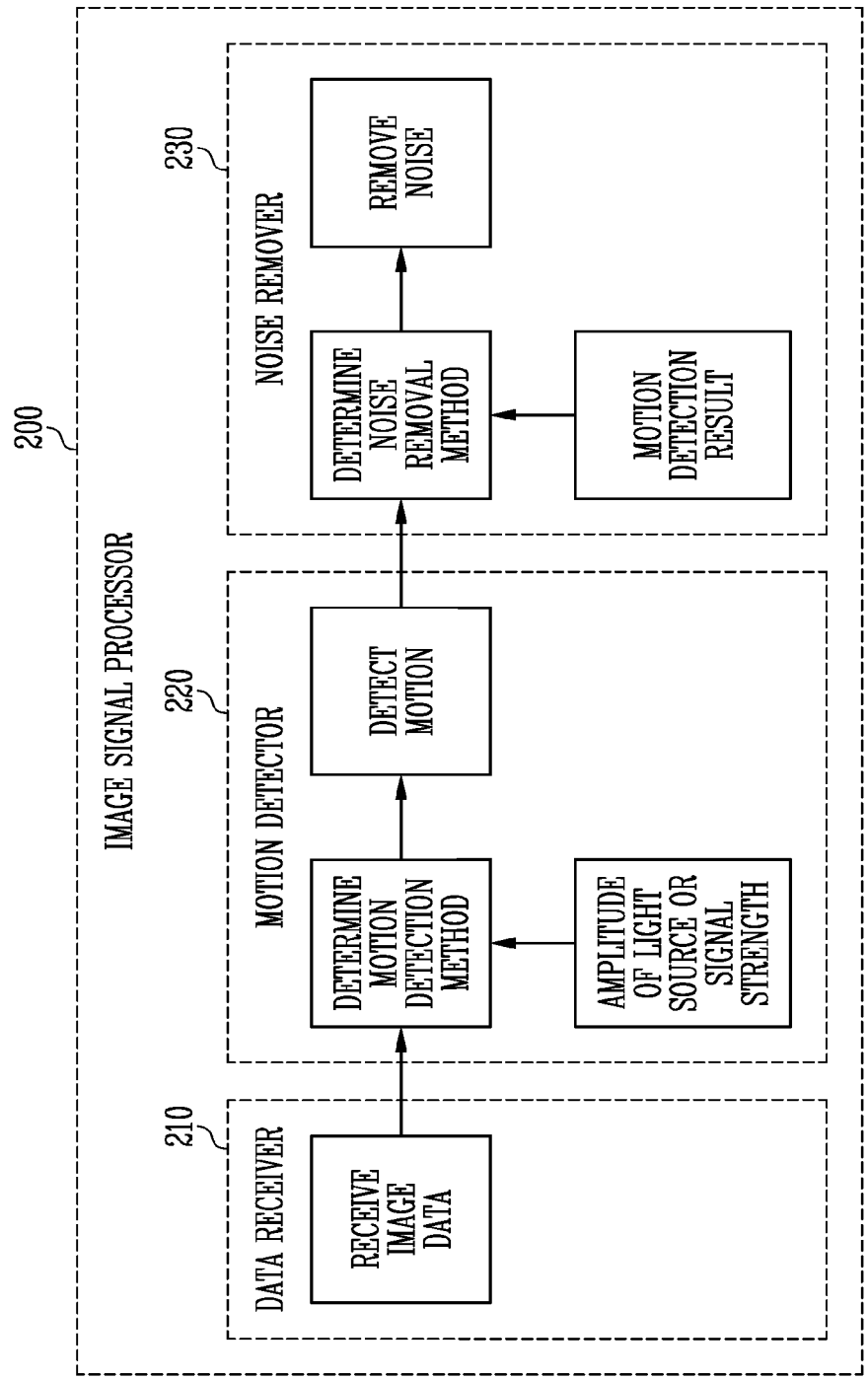
FIG. 2 is a diagram illustrating an image signal processor according to an embodiment of the present disclosure.

FIG. 2 is a diagram illustrating an image signal processor according to an embodiment of the present disclosure.

Referring to FIG. 2, the image signal processor 200 may receive image data, detect the amplitude of light impinging on pixels, detect motion and remove noise contained in an image represented by the image data. More particularly, the image signal processor 200 may select one of at least two different methods of detecting motion in the image. And depending on the result of motion detection, the image signal processor may select one of at least two different methods of removing noise contained in the image.

The data receiver 210 may receive image data including depth values respectively corresponding to pixels included in the image from a distance measurement sensor which uses a light source for modulating amplitude. The amplitude of the light source may indicate the strength of a signal generated by the light source. The data receiver 210 may receive image data, corresponding to a single frame, multiple times depending on the frame rate of an image sensor included in the distance measurement sensor. The data receiver 210 may receive image data corresponding to successive frames.

The motion detector 220 may select a at a motion detection method from at least two different motion detection methods. A first detection method uses pixels, based on the amplitude of the light emitted from a light source. A second detection method uses preset kernels.

The motion detector 220 may detect motion in an image using image data corresponding to previous images generated before the target image or subsequent images that are generated after the target image. The motion detector 220 may generate a detection result indicating whether motion is included in the target image depending on the target motion detection method.

The motion detector 220 may determine the first detection method to be the target motion detection method in response to the case where the amplitude of the light source is greater than a preset amplitude threshold value. As the amplitude of the light source is greater, the strength of the signal generated by the light source may be increased. The first detection method may be a method of determining whether motion is included in the target image, based on the depth values of first pixels included in a previous image that is generated before the target image and the depth values of second pixels included in the target image.

The motion detector 220 may calculate the difference between depth values at the same position in the previous image and the target image based on the depth values of the first pixels and the depth values of the second pixels. The motion detector 220 may count the number of motion pixels for which the difference between the depth values is greater than a preset difference threshold value.

The motion detector 220 may generate a first detection result indicating that motion is included in the target image in response to the case where the number of motion pixels is greater than a preset motion threshold value. The first detection result may indicate that motion has been detected in the target image.

The motion detector 220 may generate a second detection result indicating that no motion is included in the target image in response to the case where the number of motion pixels is less than or equal to the preset motion threshold value. The second detection result may indicate that motion has not been detected in the target image.

The motion detector 220 may determine the second detection method to be the target motion detection method in response to the case where the amplitude of the light source is less than or equal to the preset amplitude threshold value. As the amplitude of the light source is smaller, the strength of the signal generated by the light source may be lower. As the strength of the signal is lower, the possibility that noise will be contained in the signal may increase. The second detection method may be a method of determining whether motion is included in the target image based on the average values of depth values included in kernels set in a previous image that is generated before the target image and in the target image.

The motion detector 220 may calculate the average value difference between the kernels set at the same position in the previous image and the target image based on the average values of the depth values. The motion detector 220 may count the number of motion kernels for which the average value difference is greater than the preset difference threshold value.

The motion detector 220 may generate a first detection result indicating that motion is included in the target image in response to the case where the number of motion kernels is greater than the preset motion threshold value. The motion detector 220 may generate a second detection result indicating that no motion is included in the target image in response to the case where the number of motion kernels is less than or equal to the preset motion threshold value.

The noise remover 230 may determine a target noise removal method of removing noise contained in the target image between a first noise removal method which uses the image data corresponding to previous images that are generated before the target image, or a second noise removal method which uses only the image data corresponding to the target image, based on the detection result. The noise remover 230 may perform a noise removal operation based on the target noise removal method.

The noise remover 230 may determine the first noise removal method to be the target noise removal method in response to the detection result indicating that motion is not included in the target image. The noise remover 230 may perform a noise removal operation based on the first noise removal method in response to the generation of the second detection result. The first noise removal method may be a method of obtaining a weighted sum of the depth value of the target image and the depth values of the previous images corresponding to the same position as the target image.

The noise remover 230 may determine the second noise removal method to be the target noise removal method in response to the detection result indicating that motion is included in the target image. The noise remover 230 may perform a noise removal operation based on the second noise removal method in response to the generation of the first detection result. The second noise removal method may be a method of correcting the depth value of a noise pixel corresponding to noise contained in the target image based on the depth values of pixels neighboring the noise pixel.

In an embodiment of the present disclosure, the target image may be an image corresponding to a current frame. The motion detector 220 may detect motion included in the corresponding image using image data corresponding to frames previous to or subsequent to the current frame. The motion detector 220 may determine the target motion detection method of detecting motion included in the current frame image between the first detection method and the second detection method, based on the strength of the signal generated by the light source. The motion detector 220 may generate a detection result indicating whether motion is included in the current frame image based on the target motion detection method.

The noise remover 230 may remove noise in a current frame image, based on a first noise removal method which uses image data corresponding to previous frames preceding the current frame in response to the generation of the second detection result indicating that motion has not been detected in the current frame image. In an embodiment of the present disclosure, the first noise removal method may be a multi-frame noise removal method.

The noise remover 230 may remove noise from a current frame in response to the generation of the first detection result indicating that motion has been detected in the current frame image. In an embodiment of the present disclosure, the second noise removal method may be a single-frame noise removal method.

Figure 3:
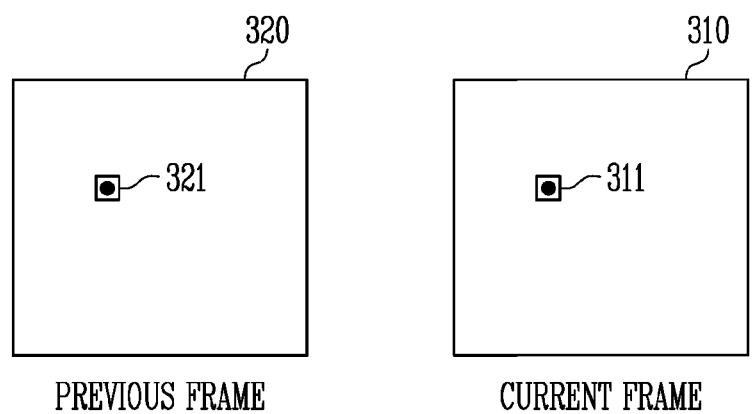
FIG. 3 is a diagram illustrating a motion detection method using pixels according to an embodiment of the present disclosure.

FIG. 3 is a diagram illustrating a motion detection method using pixels according to an embodiment of the present disclosure.

Referring to FIG. 3, a current frame image 310 and a previous frame image 320 that is generated before the current frame image may be illustrated. Pixels 311 and 321 to be compared with each other in the current frame image 310 and the previous frame image 320 may be indicated by pixels, each marked with a point. In FIG. 3, it may be assumed that the amplitude of the light source is greater than a preset amplitude threshold value. Because the amplitude of the light source is greater than the amplitude threshold value, it may be assumed that there is a weak possibility that noise will be contained in the current frame image 310 and the previous frame image 320. Depending on the amplitude of the light source, the motion detection method may be the first detection method of FIG. 2.

The motion detector may compare the depth values of the first pixels included in the previous frame image 320 with the depth values of the second pixels included in the current frame image 310, and may then generate a detection result indicating whether motion is included in the current frame image 310. The motion detector may calculate the difference between the depth values of the first pixel 321 and the second pixel 311 corresponding to the same position in the images. The motion detector may calculate the differences between depth values (depth value differences) at other positions.

The motion detector may count the number of motion pixels for which the depth value difference is greater than a difference threshold value. The motion detector may generate a first detection result indicating that motion has been detected in the current frame image 310 when the number of motion pixels is greater than the motion threshold value. The motion detector may generate a second detection result indicating that motion has not been detected in the current frame image 310 when the number of motion pixels is less than or equal to the motion threshold value.

In an embodiment of the present disclosure, the difference threshold value and the motion threshold value may be preset, or may be determined adaptively depending on the sensed image. As the magnitudes of the difference threshold value and the motion threshold value are smaller, motion may be more sensitively detected, but the detection result may be more vulnerable to noise. As the magnitudes of the difference threshold value and the motion threshold value are larger, the detection result may be more insensitive to noise, but a detection result indicating that motion is not detected may be generated even if motion is included in the corresponding image. The difference threshold value and the motion threshold value may be associated with the accuracy of the detection result.

In FIG. 3, it is assumed that there is a weak possibility that noise will be contained in the current frame image 310 and the previous frame image 320. The accuracy of the detection result may thus be higher even though the magnitudes of the difference threshold value and the motion threshold value are relatively small. The first detection method described in FIG. 3 may have a lower computational load and a higher detection speed than those of a second detection method, which will be described below with reference to FIG. 4.

As used herein, a kernel is a matrix slid across an image and multiplied with an input such that the output is enhanced a certain way.

Figure 4:
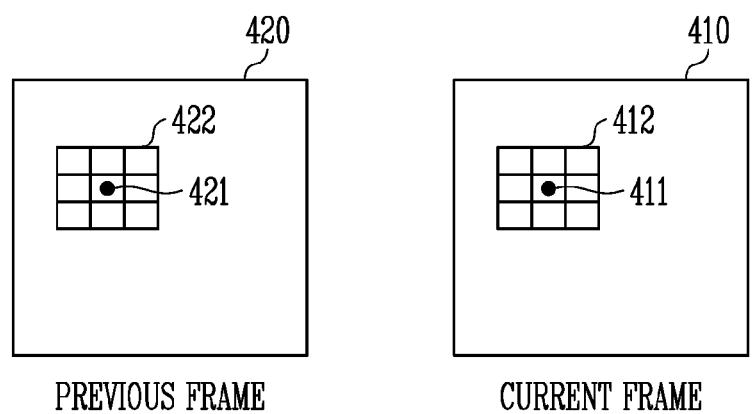
FIG. 4 is a diagram illustrating a motion detection method using kernels according to an embodiment of the present disclosure.

FIG. 4 is a diagram illustrating a motion detection method using kernels according to an embodiment of the present disclosure.

Referring to FIG. 4, a current frame image 410 and a previous frame image 420, which immediately precedes the current frame image may be illustrated. In the previous frame image 420, a first kernel 422 centered around a first pixel 421 marked with a point may be set. In the current frame image 410, a second kernel 412 centered around a second pixel 411 marked with a point may be set.

Although the size of the kernels 412 and 422 set in FIG. 4 is illustrated as 3*3, this is only an example, and the sizes and shapes of the kernels may be variously implemented. For example, the sizes and shapes of the kernels may be determined depending on the whole average of the depth values of the current frame image 410 or the magnitude of the depth value of a central pixel.

In FIG. 4, it may be assumed that the amplitude of the light source is less than or equal to a preset amplitude threshold value. It may be assumed that there is a strong possibility that noise will be contained in the current frame image 410 and the previous frame image 420 depending on the amplitude of the light source. The motion detection method described in FIG. 4 may be the second detection method of FIG. 2.

The motion detector may calculate a first average value that is the average value of the depth values included in the first kernel 422 and a second average value that is the average value of the depth values included in the second kernel 412. The first kernel 422 and the second kernel 412 may be kernels set at the same position in the current frame image 410 and the previous frame image 420. The motion detector may calculate an average value difference that is the difference between the first average value and the second average value. The motion detector may calculate the average value difference by changing the position of the central pixel.

The motion detector may count the number of motion kernels for which the average value difference is greater than a difference threshold value. The motion detector may generate a first detection result indicating that motion has been detected in the current frame image 410 when the number of motion kernels is greater than a motion threshold value. The motion detector may generate a second detection result indicating that motion has not been detected in the current frame image 410 when the number of motion kernels is less than or equal to the motion threshold value. The first detection result and the second detection result may have the same meanings as the first detection result and the second detection result of FIG. 3.

Similar to FIG. 3, the difference threshold value and the motion threshold value may be preset, or may be determined adaptively depending on the sensed image. In an embodiment of the present disclosure, the difference threshold value of FIG. 3 may be identical to the difference threshold value of FIG. 4, and the motion threshold value of FIG. 3 may be identical to the motion threshold value of FIG. 4.

Because the second detection method described in FIG. 4 has a higher computational load than that of the first detection method described in FIG. 3, the detection speed of the second detection method may be lower than that of the first detection method. Because it is assumed in FIG. 4 that there is a strong possibility that noise will be contained in the current frame image 410 and the previous frame image 420, the motion detector may determine the second detection method with higher accuracy of a detection result to be the motion detection method even though the detection speed is lower.

Although, in FIGS. 3 and 4, the method of detecting motion using the image data corresponding to the current frame image 310 or 410 and the previous frame image 320 or 420 has been described, this method is only an embodiment, and embodiments of the present disclosure are not limited thereto. For example, motion may be detected using image data corresponding to the current frame image 310 or 410 and a frame image subsequent to the current frame image 310 or 410 or using all of image data corresponding to frame images previous to and subsequent to the current frame image 310 or 410.

Figure 5:
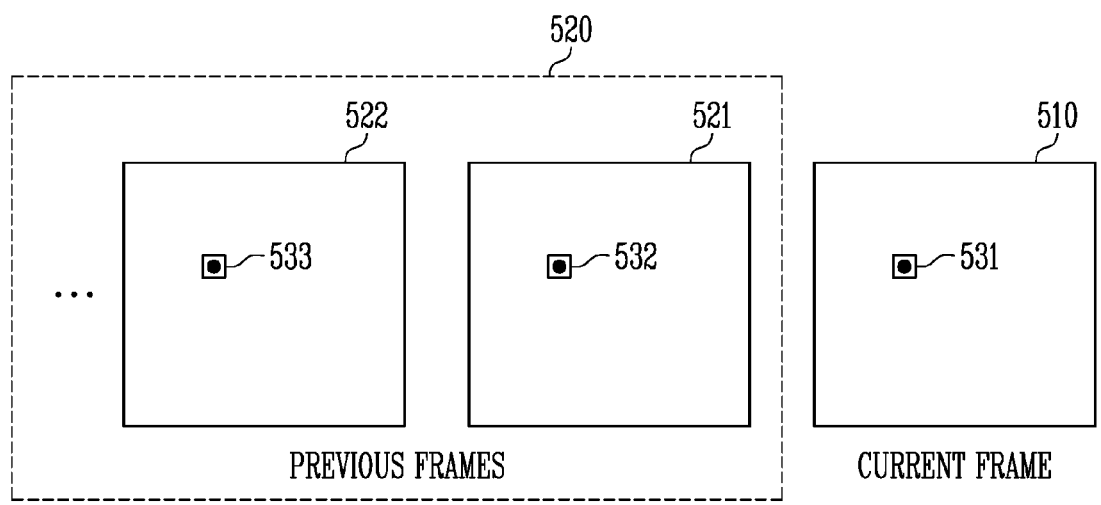
FIG. 5 is a diagram illustrating a noise removal method using image data corresponding to multiple frames according to an embodiment of the present disclosure.

FIG. 5 is a diagram illustrating a noise removal method using image data corresponding to multiple frames according to an embodiment of the present disclosure.

Referring to FIG. 5, a current frame image 510 and previous frame images 520 generated before the current frame image 510 are illustrated. The previous frame images 520 may include a first previous frame image 521 that precedes the current frame image 510 by one frame and a second frame image 522 that precedes the current frame image 510 by 2 frames.

In FIG. 5, it may be assumed that a second detection result indicating that motion has not been detected in the current frame image is generated. The multi-frame noise removal method described with reference to FIG. 5 may be the first noise removal method of FIG. 2.

The current frame image 510 may include a target pixel 531 detected as noise. The previous frame images 520 may include comparison pixels 532 and 533 having the same position as the target pixel 531. The noise remover may generate the corrected depth value of the target pixel 531 by obtaining a weighted sum of the depth value of the target pixel 531 and the depth values of the comparison pixels 532 and 533. The corrected depth value is represented as follows.

$$\text{depth\_new} = a \times \text{depth\_target} + b \times \text{depth\_com1} + c \times \text{depth\_com2}$$

$$a + b + c = 1$$

Here, depth_new may be the depth value of the corrected target pixel 531, depth_target may be the depth value of the target pixel 531 before being corrected, depth_com1 and depth_com2 may be the depth values of the comparison pixels 532 and 533, and a, b, and c may be weight coefficients.

Although, in FIG. 5, the number of comparison pixels is illustrated as 2, this is only an example, and embodiments of the present disclosure are not limited thereto. For example, the number of comparison pixels may be one or more. Further, a subsequent frame image generated after the current frame image 510 may be used in a noise removal operation.

When the number of comparison pixels is 1, the corrected depth value is represented as follows.

$$\text{depth\_new} = a \times \text{depth\_target} + (1 - a) \times \text{depth\_com1}$$

Figure 6:
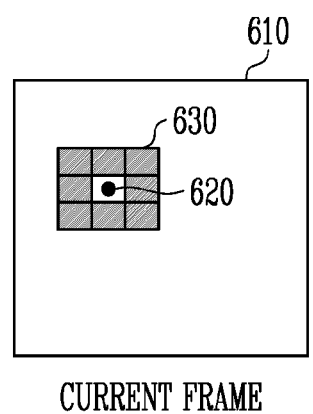
FIG. 6 is a diagram illustrating a noise removal method using image data corresponding to a single frame according to an embodiment of the present disclosure.

Because it is assumed that motion is not detected in the current frame image 510, the multi-frame noise removal method may have better noise removal performance than the single-frame noise removal method to be described in FIG. 6. In an embodiment of the present disclosure, the multi-frame noise removal operation may be performed on the target pixel 531 detected as a noise pixel. In an embodiment of the present disclosure, the multi-frame noise removal operation may be performed on all pixels included in the current frame image 510 regardless of which the corresponding pixel is detected as a noise pixel.

FIG. 6 is a diagram illustrating a noise removal method using image data corresponding to a single frame according to an embodiment of the present disclosure.

Referring to FIG. 2, a target pixel 620 detected as a noise pixel may be contained in a current frame image 610. In FIG. 6, the target pixel 620 may be indicated in a shape in which a point is marked at the center of the corresponding pixel. The neighboring pixels 630 of the target pixel 620 may be depicted. The range of the neighboring pixels 630 may be preset or may vary depending on the depth value of the target pixel 620.

In FIG. 6, it may be assumed that a first detection result indicating that motion has been detected in the current frame image 610 is generated. The single-frame noise removal method described with reference to FIG. 6 may be the second noise removal method of FIG. 2.

In FIG. 6, the corrected depth value of the target pixel 620 may be the average of the depth values of the neighboring pixels 630. The single-frame noise removal method except for the configuration described in the present specification may be existing technology disclosed prior to the present disclosure.

Because motion has been detected in the current frame image 610, noise removal performance may be deteriorated compared to the single-frame noise removal operation when the multi-frame noise removal operation, described above with reference to FIG. 5, is performed on the current frame image 610. The noise remover may determine a noise removal method by first checking whether motion is included in the current frame image 610.

Figure 7:
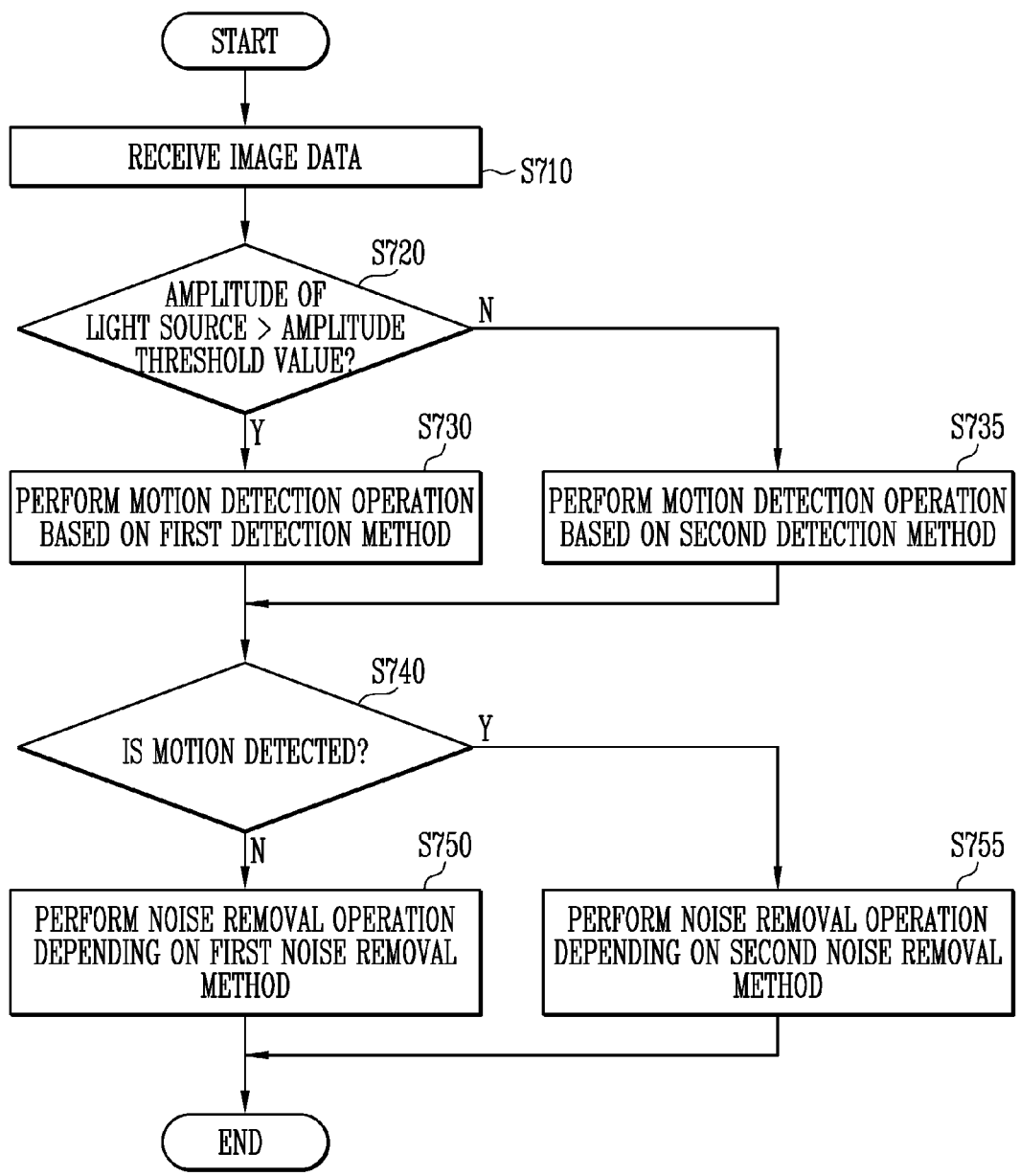
FIG. 7 is a flowchart illustrating a noise removal method according to an embodiment of the present disclosure.

FIG. 7 is a flowchart illustrating a noise removal method according to an embodiment of the present disclosure.

Referring to FIG. 7, the image signal processor may perform a noise removal operation on received image data. The image signal processor may determine an efficient motion detection method based on the amplitude of a light source used for an image sensing operation, and may determine an efficient noise removal method based on the result of motion detection.

At step S710, the data receiver may receive image data including depth values respectively corresponding to pixels included in an image from a distance measurement sensor which uses a light source for modulating amplitude. The amplitude of the light source may indicate the strength of a signal generated by the light source.

At step S720, the motion detector may compare the amplitude of the light source with an amplitude threshold value. The motion detector may determine a first detection method which uses pixels to be a target motion detection method in response to the case where the amplitude of the light source is greater than the amplitude threshold value at step S730. The motion detector may determine a second detection method which uses preset kernels to be the target motion detection method in response to the case where the amplitude of the light source is less than or equal to the amplitude threshold value at step S735.

At step S730, the motion detector may calculate the difference between depth values (depth value difference) at the same position based on the depth values of first pixels included in a previous image that is generated before a target image and the depth values of second pixels included in the target image. The motion detector may count the number of motion pixels for which the depth value difference is greater than a preset difference threshold value.

At step S735, the motion detector may calculate an average value difference between kernels set at the same position based on the average values of depth values included in kernels set in the previous image that is generated before the target image and in the target image. The motion detector may count the number of motion kernels for which the average value difference is greater than the preset difference threshold value.

At step S740, the motion detector may determine whether motion is included in the target image based on the number of motion pixels, or may determine whether motion is included in the target image based on the number of motion kernels. The motion detector may generate a first detection result indicating that motion is included in the target image in response to the case where the number of motion pixels or the number of motion kernels is greater than a preset motion threshold value. When the first detection result is generated, the process may proceed to step S755. The motion detector may generate a second detection result indicating that motion is not included in the target image in response to the case where the number of motion pixels or the number of motion kernels is less than or equal to the preset motion threshold value. When the second detection result is generated, the process may proceed to step S750.

At step S750, the noise remover may perform a noise removal operation depending on a first noise removal method which uses image data corresponding to previous images that are generated before the target image in response to the detection result indicating that motion is not included in the target image. The first noise removal method may correspond to description of FIG. 5.

At step S755, the noise remover may perform a noise removal operation depending on a second noise removal method which uses only image data corresponding to the target image in response to the detection result indicating that motion is included in the target image. The second noise removal method may correspond to description of FIG. 6.

FIG. 8 is a block diagram illustrating an electronic device including an image signal processor according to an embodiment of the present disclosure.

Referring to FIG. 8, an electronic device 3000 may include an input/output device 3100, a sensing device 3200, a memory device 3300, a processor 3400, a display device 3500, and a power supply 3600. For example, the electronic device 3000 may be a smart phone, a wearable device, a home appliance, a medical instrument, or a measuring device.

The input/output device 3100 may output data or commands generated by the electronic device 3000 to other electronic devices or receive data or commands generated by other electronic devices. The input/output device 3100 may include a communication device 3110 capable of transmitting/receiving data to/from an external system.

The communication device 3110 may connect the electronic device 3000 to other electronic devices using wired/wireless communication. The communication device 3110 may communicate with an additional electronic device 3900 or a server 3950 over a wide area network or communicate with a peripheral electronic device 3800 over a local area network. The electronic device 3000 may be connected to the electronic device L 3800 over the local area network or connected to the electronic device W 3900 or the server 3950 over the wide area network. A system including the electronic devices connected to each other over the communication network may be implemented.

For example, the server 3950 may store data received from the electronic devices or may manage the electronic devices in an integrated manner based on the received data. Further, the electronic device 3000 may generate data related to the electronic device 3000 or generate commands for controlling the electronic device L 3800 and the electronic device W 3900, based on the data stored in the server 3950.

The sensing device 3200 may include an image sensor 3210 and an inertial sensor 3220. The sensing device 3200 may sense external change of the electronic device 3000 through the image sensor 3210, and may sense internal change of the electronic device 3000 through the inertial sensor 3220. Sensing data generated by the sensing device 3200 may be transferred to and stored in the memory device 3300. In an embodiment of the present disclosure, the sensing device 3200 may include a light source, and may be a time-of-flight (ToF) sensor.

The memory device 3300 may store data to be used for the electronic device 3000. The memory device 3300 may store software or a program, or may store sensing data and commands generated by the electronic device 3000. Further, the memory device 3300 may store user information, data and commands received through the input/output device 3100. The memory device 3300 may be a volatile memory in which data is retained only when power is supplied and a nonvolatile memory in which data is retained regardless of whether power is supplied. In an embodiment of the present disclosure, the image sensor 3210 may store image data in the memory device.

The processor 3400 may control the overall operation of the electronic device 3000. The processor 3400 may perform execution of software and processing or computation of data. The processor 3400 may be a microprocessor, a central processing unit (CPU) or an application processor (AP).

The processor 3400 may store data received through the input/output device 3100 in the memory device 3300, or may control the operation of the electronic device 3000 using the data stored in the memory device 3300. The processor 3400 may generate a command for controlling the operation of the electronic device 3000 or identify whether an event related to the electronic device 3000 has occurred. The processor 3400 may notify a user of information related to the data stored in the memory device 3300 via the display device 3500. The processor 3400 may supply power to electronic circuits included in the electronic device 3000 through the power supply 3600.

In an embodiment of the present disclosure, the processor 3400 may determine a target motion detection method of detecting motion included in a target image between a first detection method which uses pixels based on the amplitude of the light source and a second detection method which uses preset kernels. The processor 3400 may generate a detection result indicating whether motion is included in the target image depending on the target motion detection method. The processor 3400 may determine a target noise removal method of removing noise contained in the target image between a first noise removal method which uses the image data corresponding to previous images that are generated before the target image, or a second noise removal method which uses only the image data corresponding to the target image, based on the detection result. The processor 3400 may perform a noise removal operation depending on the target noise removal method.

The display device 3500 may display the state information of the electronic device 3000 or display a message related to the occurrence of an event. The power supply 3600 may supply power to individual components of the electronic device 3000 or manage a battery. The power supply 3600 may be operated in a power-saving mode for battery lifetime, or generate power required by the individual components of the electronic device 3000.

According to the present disclosure, there can be provided an image signal processor and a noise removal method, which are capable of reducing noise in a depth image. A motion detection operation corresponding to the characteristics of a light source may be determined, and a noise removal operation corresponding to whether motion is included in an image may be performed, and thus the speed and performance of an image processing operation may be improved.

The preferred embodiments of the distance measurement sensor 100 and the image signal processor 200 are preferably embodied as software, i.e., program instructions, which when executed by one or more corresponding processors, the instructions cause the one or more processors to perform the various operations described herein. In alternate embodiments, the distance measurement sensor 100 and the image signal processor 200 may be embodied as hardware, i.e., combinational and sequential logic devices, augmented with one or more processors.

The true scope of the invention disclosed herein is defined by the accompanying claims and not by the description of any particular embodiment. Functional and structural equivalents should therefore be construed as falling within the scope of the present disclosure.

What is claimed is:

1. An image signal processor comprising:
   a data receiver configured to receive image data including depth values respectively corresponding to pixels included in an image from a distance measurement sensor comprising a light source;
   a motion detector configured to detect motion in a target image represented by the image data using one of a first motion detection method, which uses pixels and a second motion detection method that uses preset kernels, determined based on an amplitude of the light source, the motion detector additionally configured to generate a detection result indicating whether the motion is included in the target image; and
   a noise remover configured to remove noise from the target image using one of a first noise removal method that uses previous image data corresponding to previous images generated before the target image is generated and a second noise removal method that uses only the image data corresponding to the target image, determined based on the detection result;
   wherein the noise remover is configured to:
      remove the noise using the first noise removal method responsive to the motion detection result indicating that the motion is not included in the target image or
      remove the noise using the second noise removal method responsive to the motion detection result indicating that the motion is included in the target image.

2. The image signal processor according to claim 1, wherein:
   the motion detector is configured to detect the motion using the first motion detection method in response to the amplitude of the light source being greater than a preset amplitude threshold value, and
   the first detection method determines whether the motion is included in the target image based on depth values of first pixels included in the previous images and depth values of second pixels included in the target image are generated.

3. The image signal processor according to claim 2, wherein the motion detector is configured to calculate a depth value difference at a position of the target image based on the depth values of the first pixels and the depth values of the second pixels, and wherein the motion detector is configured to count a number of motion pixels for which the depth value difference is greater than a preset difference threshold value, and configured to generate a first detection result indicating that the motion is included in the target image in response to the number of motion pixels being greater than a preset motion threshold value.

4. The image signal processor according to claim 3, wherein the motion detector is configured to generate a second detection result indicating that the motion is not included in the target image in response to the number of motion pixels being less than or equal to the preset motion threshold value.

5. The image signal processor according to claim 1, wherein:
   the motion detector is configured to detect the motion using the second motion detection method responsive to the amplitude of the light source being less than or equal to a preset amplitude threshold value, and
   the second detection method determines whether the motion is included in the target image responsive to average depth values included in kernels set in the previous images.

6. The image signal processor according to claim 5, wherein the motion detector is configured to calculate an average value difference between the kernels set at an identical position responsive to: the average depth values and motion kernels for which the average value difference is greater than a preset difference threshold value, the motion detector being additionally configured to generate a first detection result indicating that the motion is included in the target image when the number of motion kernels is greater than a preset motion threshold value.

7. The image signal processor according to claim 6, wherein the motion detector is configured to generate a second detection result indicating that the motion is not included in the target image when the number of motion kernels is less than or equal to the preset motion threshold value.

8. The image signal processor according to claim 1, wherein
   the first noise removal method is obtaining a weighted sum of a depth value of the target image and depth values of the previous images corresponding to a position identical to that of the target image.

9. The image signal processor according to claim 1, wherein
   the second noise removal method is correcting a depth value of a noise pixel corresponding to the noise contained in the target image based on depth values of pixels neighboring the noise pixel.

10. A noise removal method in an image signal processor, the method comprising:
    receiving image data including depth values respectively corresponding to pixels included in an image obtained from a distance measurement sensor, which uses a light source for modulating amplitude;
    determining motion in a target image using at least one of: a first detection method that uses pixels based on an amplitude of the light source and a second detection method that uses preset kernels;
    generating a detection result indicating whether the motion is included in the target image depending on the target motion detection method;
    selecting, based on the detection result, a target noise removal method that is one of: a first noise removal method that uses previous image data corresponding to previous images generated before the target image is generated and a second noise removal method that uses only the image data corresponding to the target image; and performing a noise removal operation depending on the target noise removal method:

wherein the determining the target noise removal method comprises:

selecting the first noise removal method responsive to the detection result indicating that the motion is not included in the target image or selecting the second noise removal method as the target noise removal method in response to the detection result indicating that the motion is included in the target image.

11. The noise removal method according to claim 10, wherein selecting the target motion detection method comprises:

determining the first detection method to be the target motion detection method in response to the amplitude of the light source being greater than a preset amplitude threshold value; and generating the motion detection result comprises:

calculating a depth value difference at an identical position based on depth values of first pixels included in the previous images and depth values of second pixels included in the target image;

counting a number of motion pixels for which the depth value difference is greater than a preset difference threshold value; and determining whether the motion is included in the target image based on the number of motion pixels.

12. The noise removal method according to claim 11, wherein determining whether the motion is included in the target image comprises generating a first detection result indicating that the motion is included in the target image in response to the number of motion pixels being greater than a preset motion threshold value.

13. The noise removal method according to claim 11, wherein determining whether the motion is included in the target image comprises generating a second detection result indicating that the motion is not included in the target image in response to the number of motion pixels being less than or equal to a preset motion threshold value.

14. The noise removal method according to claim 10, wherein:

selecting the target motion detection method comprises:

selecting the second detection method in response to the amplitude of the light source being less than or equal to a preset amplitude threshold value, and generating the detection result comprises:

calculating an average value difference between kernels set at an identical position based on average depth values included in kernels set in the previous images and in the target image;

counting a number of motion kernels for which the average value difference is greater than a preset difference threshold value; and determining whether the motion is included in the target image based on the number of motion kernels.

15. The noise removal method according to claim 14, wherein determining whether the motion is included in the target image comprises generating a first detection result indicating that the motion is included in the target image when the number of motion kernels is greater than a preset motion threshold value.

16. The noise removal method according to claim 14, wherein determining whether the motion is included in the target image comprises generating a second detection result indicating that the motion is not included in the target image when the number of motion kernels is less than or equal to a preset motion threshold value.

17. The noise removal method according to claim 10, wherein performing the noise removal operation comprises obtaining a weighted sum of a depth value of the target image and depth values of the previous images corresponding to a position identical to that of the target image.

18. The noise removal method according to claim 10, wherein performing the noise removal operation comprises correcting a depth value of a noise pixel corresponding to the noise contained in the target image based on depth values of pixels neighboring the noise pixel.

19. An image system comprising:

a distance measurement sensor comprising a light source and that is configured to generate image data including depth information using the light source; and an image signal processor configured to remove noise contained in a current frame image based on the image data received from the distance measurement sensor:

wherein the image signal processor comprises:

a motion detector configured to detect motion in the current frame image using one of a first detection method that uses pixels based on strength of a signal generated by the light source and, a second detection method that uses preset kernels, and to generate a detection result indicating whether the motion is included in the current frame image depending on the target motion detection method; and a noise remover configured to remove noise in the current frame image using one of a first noise removal method that uses previous image data corresponding to previous frames that precedes a current frame and a second noise removal method that uses only the image data corresponding to the current frame and to perform a noise removal operation depending on the target noise removal method.

* * * * *